United States Patent [19]

Pfaffinger

[11] Patent Number: 5,368,427
[45] Date of Patent: Nov. 29, 1994

[54] QUARTER TURN FASTENER

[75] Inventor: David A. Pfaffinger, Warren, Ohio

[73] Assignee: General Motors Corporation, Detroit, Mich.

[21] Appl. No.: 14,603

[22] Filed: Feb. 8, 1993

[51] Int. Cl.⁵ ............................................. F16B 21/00
[52] U.S. Cl. .................................. 411/553; 411/349; 24/591; 24/593; 24/703.1
[58] Field of Search ............... 411/553, 552, 551, 550, 411/549, 349; 24/591, 593, 595, 597, 703.1

[56] References Cited

U.S. PATENT DOCUMENTS

| | | | |
|---|---|---|---|
| 2,373,722 | 4/1945 | von Opel | 411/549 |
| 2,385,180 | 9/1945 | Allen | 411/551 |
| 2,555,291 | 5/1951 | Poupitch | 411/549 |
| 2,601,213 | 6/1952 | Poupitch | 411/349 |
| 2,620,539 | 12/1952 | Poupitch | 24/221 |
| 3,123,389 | 3/1964 | Biesecker | 292/218 |
| 3,568,263 | 3/1971 | Meehan | 411/553 |
| 3,800,369 | 4/1974 | Nikolits et al. | 24/221 R |
| 4,442,571 | 4/1984 | Davis et al. | 411/552 |
| 4,599,768 | 7/1986 | Doyle et al. | 24/590 |
| 5,011,355 | 4/1991 | Motoshige | 411/552 |
| 5,011,356 | 4/1991 | Fernandez | 411/553 |

FOREIGN PATENT DOCUMENTS 1256295 12/1971 United Kingdom ................ 411/553
2020349 11/1979 United Kingdom ................ 24/591

Primary Examiner—Flemming Saether
Attorney, Agent, or Firm—Ernest E. Helms

[57] ABSTRACT

A fastening arrangement is provided which, in a preferred embodiment, includes a first member having first and second surfaces and an elongated aperture intersecting the first and second surfaces, a second member having a first surface for contacting the first member, and an aperture for registration with the first member aperture. The second member also has a second surface with a ramp generally opposite the first surface, and the second member second surface has two arms. A pin having a midportion with a first surface with a ramp for engagement with the ramp of the second member second surface is also provided. The pin also has projecting from the midportion a lock wing and on a side of the midportion opposite the lock wing a thumb tab. To secure the first and second members together, the pin lock wing is projected through the apertures of the first and second members, and an angular relocation of the pin causes the lock wing to secure itself against the first surface of the first member.

28 Claims, 4 Drawing Sheets

QUARTER TURN FASTENER

FIELD OF THE INVENTION

The field of the present invention is that of panel fasteners and, more particularly, to panel fasteners typically referred to as quarter turn fasteners.

DISCLOSURE STATEMENT

There are many "quick fastening" systems available. Almost all of the prior quick fastening systems have the disadvantage of requiring some special detail to be formed on the surface of an attachment (a bottom first plate or member to be attached to an upper second plate or member). An additional disadvantage is that many quick fastening systems require multiple piece fasteners. In the assembly of automotive vehicles, it is often the situation that the bottom surface or plate is part of the stamped automotive body. The top surface or plate is part of a component which is shipped to the assembly plate location. Therefore, any special surface preparation is far preferable to be on the second plate rather than on the first plate since the second plate is part of the component and will also be closer to the automotive assembler.

Quarter turn fasteners are highly desirable because attachment may be made without the use of tooling by the assembler. However, many prior quarter turn assemblies had two distinct disadvantages. One was that the fastener was shipped loose (separate) from the second member, which is usually the component part. Therefore, the fastener first had to be attached with the second member before assembly into the vehicle. Additionally, many of the quarter turn systems had multipiece fasteners. Still another problem with using a quarter turn fastener which has a lock wing to lock under the first plate is to insure that the lock wing has the proper orientation so that the assembler does not have to align the locking wing with a slotted aperture in the first plate while also holding and aligning the component part with the first plate during assembly.

SUMMARY OF THE INVENTION

To overcome the above-noted disadvantages and to cumulatively meet challenges previously unmet by prior fasteners, the present invention is brought forth. The present invention provides a fastener system where almost all of the surface preparation is on the component part and just a simple slot is required on the sheet metal of the vehicle. Further adding to the advantage of the present invention is that a pin can be attached with the component part at the component factory and shipped therewith. In a preferred embodiment of the present invention, the pin has a shearable part wherein it is retained in the proper orientation during shipping and the assembly operator can just simultaneously align the component and a lock wing of the pin with the vehicle sheet metal and then, by simply turning the pin, cause the parts component to be affixed with the vehicle.

Other advantages of the present invention will be further apparent to those skilled in the art as the above invention is further shown and described in the accompanying drawings and detailed description.

DESCRIPTION OF THE PREFERRED EMBODIMENT

Figure 1:
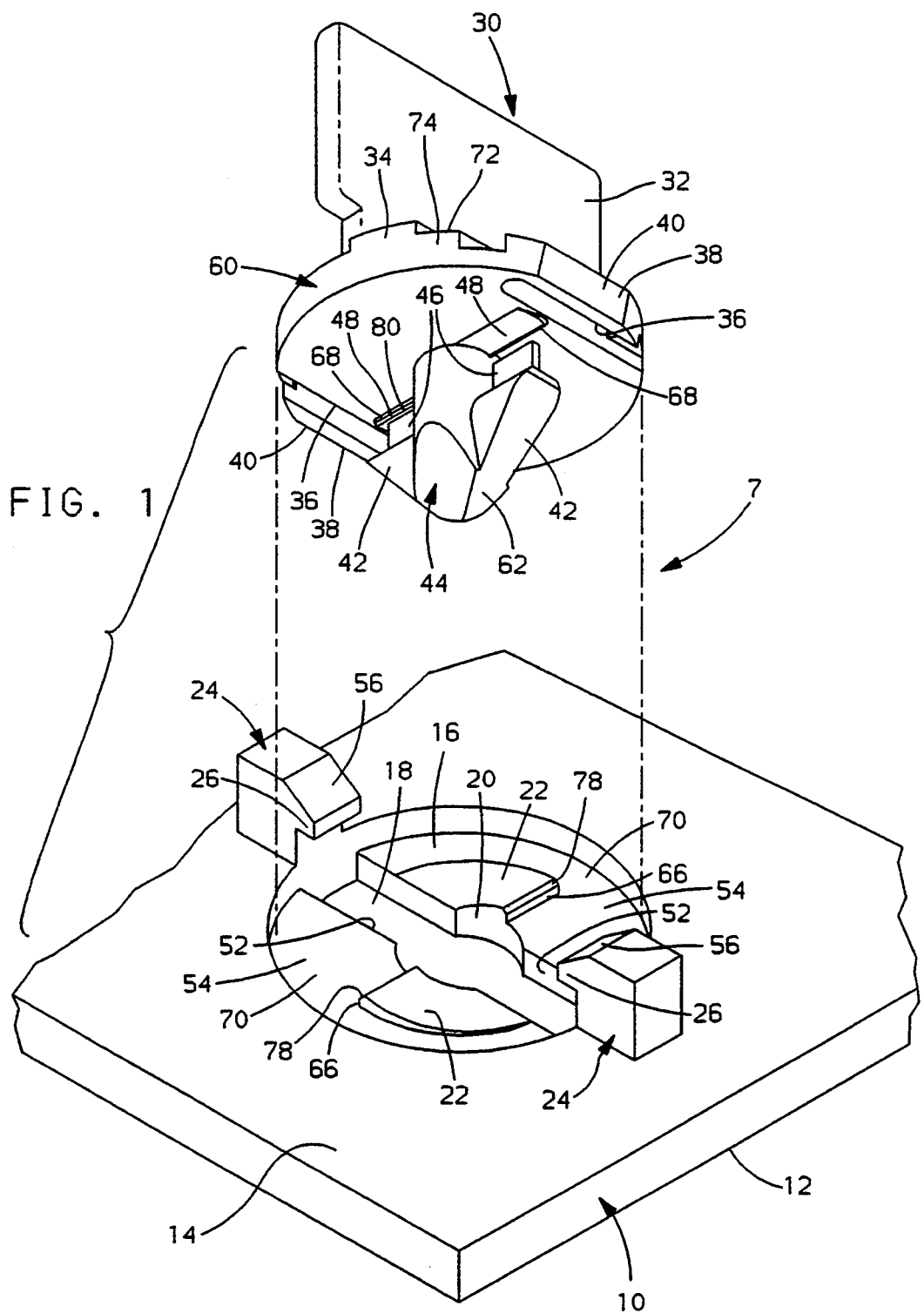
FIG. 1 is an exploded view of a preferred embodiment fastening arrangement according to the present invention before a pin is joined with a second member.
Figure 2:
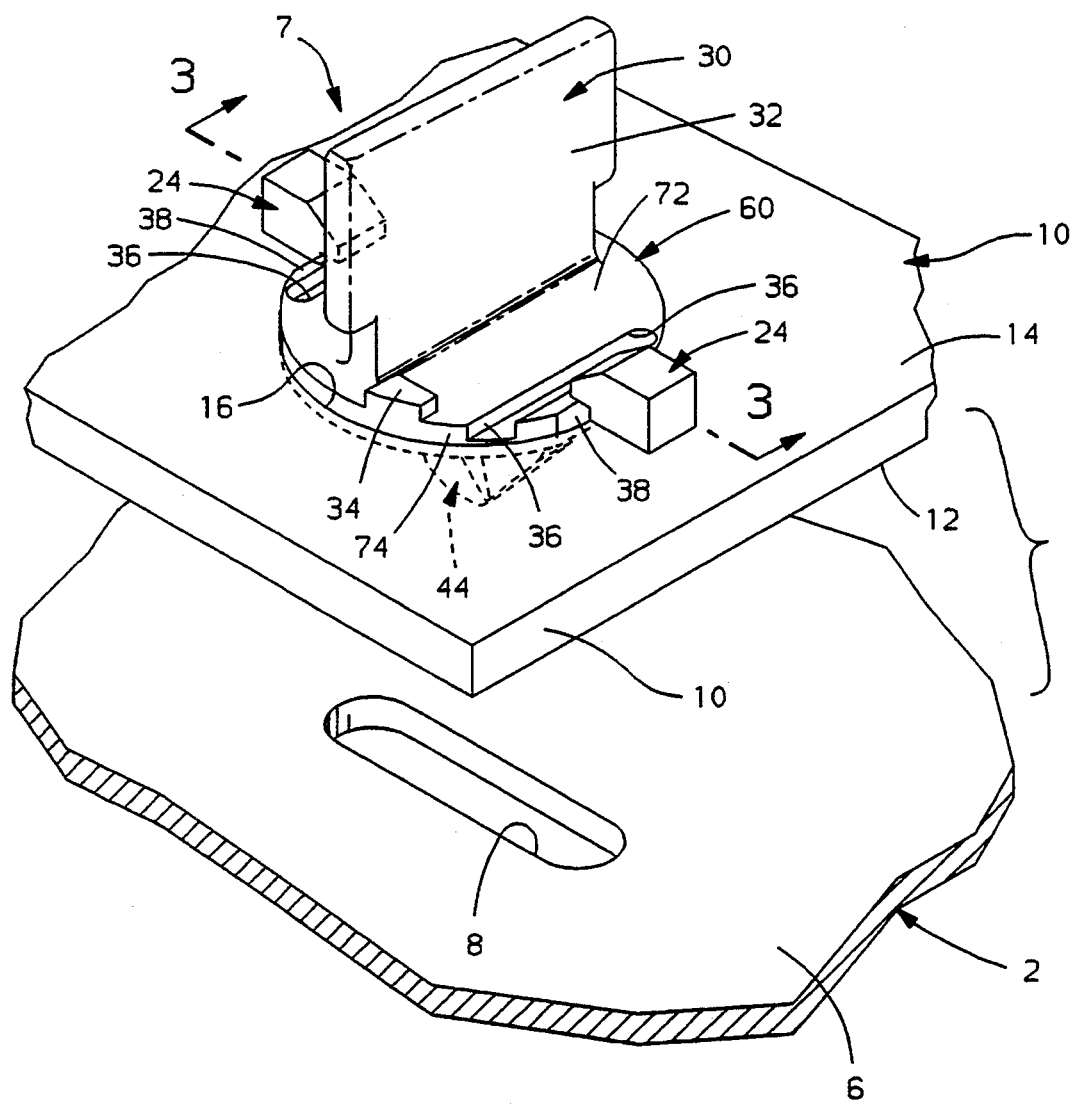
FIG. 2 is a perspective view of the pin joined with the second member before the second member is connected with a first member.
Figure 3:
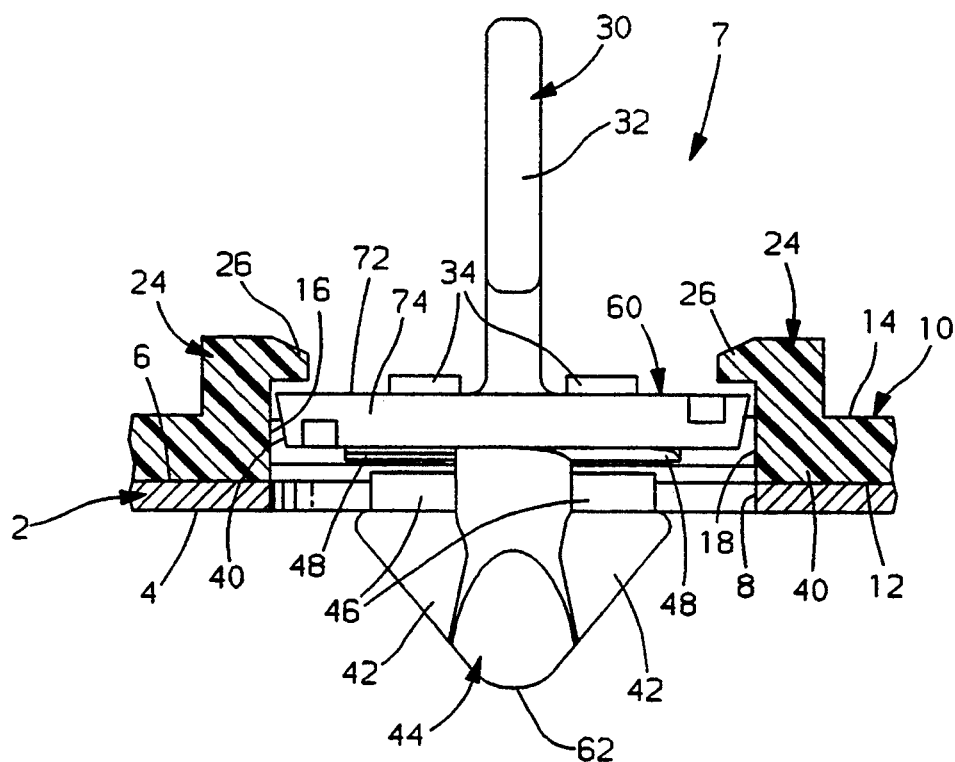
FIG. 3 is a view taken along line 3—3 of FIG. 2.

Referring to FIGS. 1 through 4, the fastener arrangement 7 of the present invention has a first plate or member 2, with a typical thickness range of 0.6 to 1.2 mm, which will typically be a part of the automotive body. The first member 2 has a first surface 4 and an opposing second surface 6. The first 4 and second 6 surfaces are intersected by an elongated aperture or slot 8. The elongation of the slot 8 which measures approximately 16 mm allows the attached location to have some room for adjustment along an axis of elongation.

Secured to the first member 2 is a second plate or member 10 with a thickness range of 1 to 3 min. The second member 10 has a first surface 12 for contact with the first member second surface 6. The second member 10 also has an aperture 18 intersecting the first surface 12 for registration with the slot 8. The aperture 18 has two generally straight sections 52 which connect with circular arc sections 20.

The second member 10 also has a second surface 14 opposite the first surface 12 with a circular recessed portion 16. The circular recessed portion 16 has two geometrically spaced lock ramps 22 which slope up 0.5 mm from a floor 54 of the recessed portion 16.

The second member second surface 14 also has aligned with the aperture 18 two arms 24 having projecting fingers 26. The fingers 26 have a tapered top surface 56. The second member will typically be fabricated from a moldable polymeric material and in practice may be quite rigid.

The fastening arrangement 7 is completed by a pin 30 which also is typically fabricated from a moldable polymeric material. The pin 30 has a midportion or flange 60 with slots 36 cored through it to create flexing members 38 symmetrically on either side of the flange 60. Two lock ramps 48, similar to the ones on the lock ramps 22 on the second member 10 but in the opposing direction, are located on the bottom of the pin flange 60. The flange 60 also includes a torsion receptive surface provided by grip or thumb tab 32. Angular stops 34 restrain the pin 30 from being over-rotated once the angular locking position of the pin 30 is reached.

Extending down from the flange 60 is a stem 44. The stem 44 is rounded at an end 62 to aid in locating the pin 30 during assembly. Attached to the stem 44 are lock wings 42 with alignment flash 46. The lock wings 42 aid in alignment during assembly and provide a normal locking surface 64 once the pin is angularly relocated to a locking position. The alignment flash 46 keeps the pin 30 in the same position as assembled to the second member 10 during shipment.

It is preferable that the second member 10 be a molded piece in order to more easily obtain the retention and lock features required of the fastening arrangement 7. The two opposing finger tapered surfaces 56 hit the tapered surface 40 of the flex members 38 to deflect the same to attach the pin 30 with the second member 10. The aperture 18 allows for the passage of the lock wings 42 through the second member 10 during assembly and also retains the alignment flash 46 during handling and shipment. The lock ramps 22 on the second member 10 act in conjunction with the lock ramps 48 of the pin 30 to create a normal locking force after final assembly.

As mentioned previously, the first member has a slot 8. The slot 8 allows the stem 44 and lock wings to pass through. The length of the slot 8 is not a functional aspect of the fastening arrangement 7. Therefore, the length of slot 8 can be extended to allow for adjustment or process variation.

As previously mentioned, to secure the pin 30 to the second member 10, stem 44 and lock wing 42 are inserted through the aperture 18. Arc portions 20 help guide the stem 44.

During initial assembly, the pin 30 is inserted into the aperture 18. Proper insertion orientation of the lock wings 42 and alignment flash 46 insure that the flex members 38 are aligned with the arms 24. The pin is pushed down, forcing the flex members 38 to deflect on the tapered angled surface 56 of the fingers 26, until the flex members 38 snap past the undercut portion of the fingers 26 and the pin is seated.

One of the important features of the present fastener arrangement is that the flex members 38 are part of the pin 30 and not part of the second member 10. This is important because the material of the second member 10 is controlled by the desired product characteristics and may be fragile or nonflexible, whereas the pin 30 can be made out of any desired material.

From this point, the second member 10/pin 30 assembly can be handled or shipped without fear of being separated. The alignment of the pin 30 to second member 10 is also maintained by the alignment flash 46 being trapped in the aperture 18.

For final assembly, the first member second surface 6 and the second member first surface 12 mating surfaces are brought into contact. As long as the aperture 18 is aligned with slot 8, the pin 30 will be lined up due to its fixed orientation described in the previous paragraph.

After the above-noted surfaces are mated, the pin is angularly relocated. The thin flash 46 will be broken when it is forced against the edge of the aperture 18 and slot 8. The initial normal force between the surfaces 6/12 will be provided by the rounded locking surface 64 of the lock wings riding up onto the first surface 4 of the bracket. Additional normal force is generated as the opposing lock ramps 48/22 of the pin 30 and the second member 10 are rotated over each other. Once the lock ramps 48/22 have passed over each other, the stops 34 come into contact with the arms 24, preventing the pin 30 from being rotated any further. The lock wing 42 will secure the pin 30 against removal from the slot 8 by their angular orientation.

Figure 5:
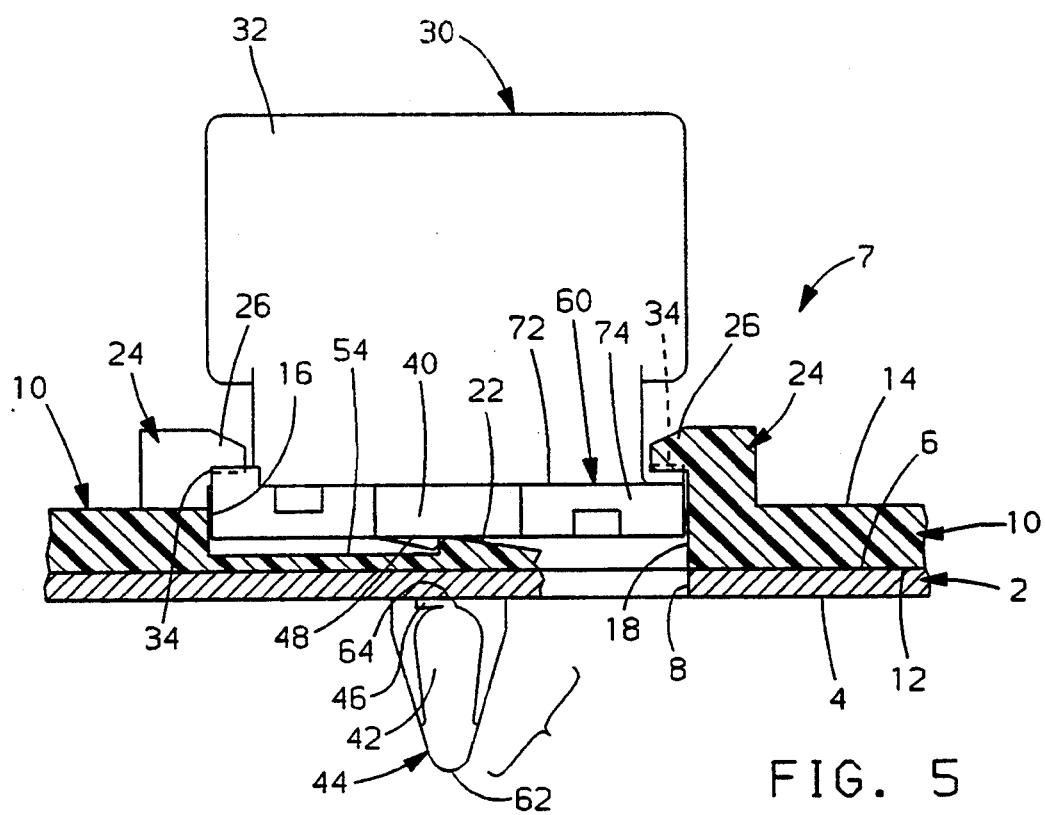
FIG. 5 is a view similar to FIG. 4 illustrating an alternate preferred embodiment of the present invention wherein alignment flash of the pin is entrapped between lock wings of the pin and the first member first surface.

The normal force between surfaces 6 and 12 exists by virtue of rounded locking surface 64 interference "fit" with the first member first surface 4. In other words, the distance between the rounded locking surface 64 and the recessed portion 16 (or the bottom surface of the flange 60 facing the recessed portion 64) is less than the distance from the first member first surface 4 to the recessed portion 16. The normal force will be further increased by the height of the ramp 22 (after full rotation of the pin 30) and by entrapment of any flash 46 (FIG. 5).

Figure 4:
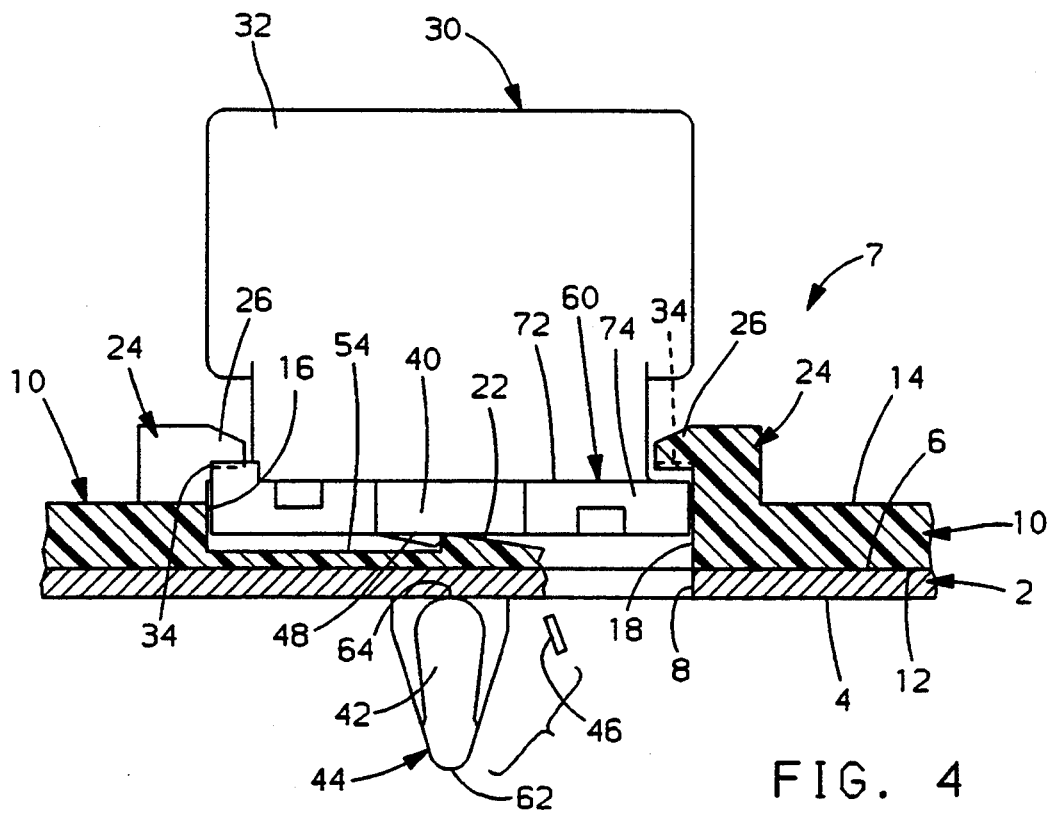
FIG. 4 is a view showing the pin after its angular relocation.

The pin 30, after its angular relocation (as shown in FIG. 4), will be maintained in the locked position by contact between lock ramp end faces 68/66 upon any inadvertent attempted turning of the pin 30 in an opposite direction. The ramps 22, 48 have respective tapered edges 78, 80 to facilitate reverse turning for removal of the pin 30 for disassembly. In the locked position as shown in FIG. 4, the pin lock ramps 48 will be contacting the recessed portion 16 along section 70.

Figure 6:
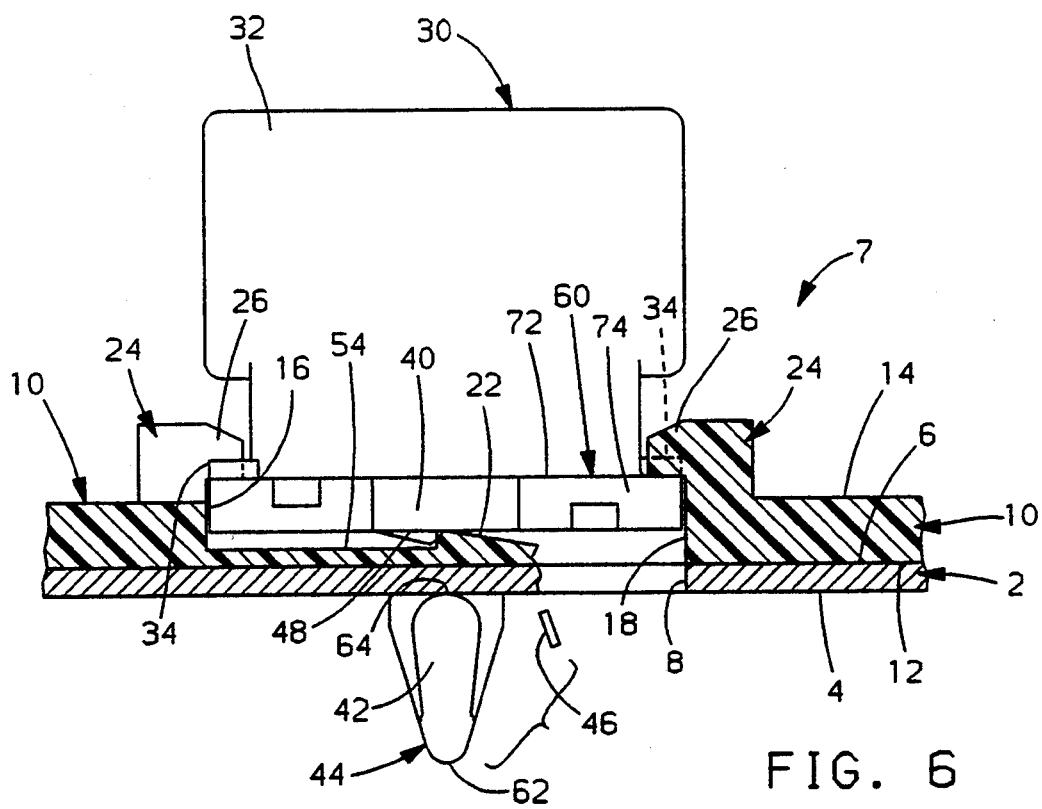
FIG. 6 is a view similar to FIG. 4 illustrating an alternate preferred embodiment of the present invention wherein arms of the second member forcibly hold down a pin midportion.

Optionally, the dimension of the pin lock ramp 48 along with the normal thickness at portions 74 of the flange 60 can be configured to insure an interference fit between the finger 26 and the recessed portion 16 (FIG. 6). Typically, however, there will always be a clearance between pin flange surface 72 and the finger 26 to allow the pin to be easier to rotate.

If desired, in an embodiment not shown, a screwdriver slot on the top of flange 60 may be substituted for the thumb tab 32.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A fastening arrangement of a first member connected with a second member comprising:
   a first member having first and second surfaces and an elongated aperture intersecting the first and second surfaces;
   a second member having a first surface for contact with the first member second surface, the second member having an aperture intersecting with the first surface for registration with the aperture of the first member, the second member also having a second surface generally opposite the first surface with a ramp; and the second member second surface having at least two arms;
   a pin having a midportion with a first surface with a ramp for engagement with the ramp of the second member second surface, the pin also having on the end of the pin adjacent the first member projecting from the midportion a lock wing, and the pin having on a side of the midportion opposite the lock wing a torsional force receptive surface to facilitate the importation of torsional force to the pin to achieve angular positional relocation of the pin, wherein to secure the first and second members together the pin lock wing is projected through the apertures of the first and second members and a torsional relocation of the pin causes the pin midportion to be displaced with respect to the second surface of the second member and for the midportion to be captured by the arm of the second member and the lock wing to be rotated to secure the pin from removal by its angular orientation with respect to the first member aperture.

2. An arrangement as described in claim 1 wherein the pin has a thumb tab providing the torsion force receptive surface.

3. An arrangement as described in claim 1 further providing means to attach the pin to the second member before angular relocation of the pin.

4. An arrangement as described in claim 3 wherein the means that attach the pin to the second member is achieved by elastic deformation.

5. An arrangement as described in claim 4 wherein the pin elastically deforms.

6. An arrangement as described in claim 5 wherein the pin has a tapered surface for contacting the second member arm, the tapered surface aids in the deformation of the pin, and the pin is thereafter held by the second member arm.

7. An arrangement as described in claim 3 further providing means to insure angular orientation of the pin.

8. An arrangement as described in claim 7 further including deformable lock wing portions which are deformed upon angular relocation of the pin.

9. An arrangement as described in claim 8 wherein the deformable lock wing portions become entrapped between the lock wing and the first member first surface upon angular relocation of the pin.

10. An arrangement as described in claim 1 wherein the second member is made of a moldable material.

11. An arrangement as described in claim 1 further providing means to prevent overturning of the pin.

12. An arrangement as described in claim 1 wherein the second surface has a recessed portion and wherein the midportion of the pin is captured therein.

13. An arrangement as described in claim 1 wherein, after angular relocation of the pin, a normal force exists between the second member arm and the pin midportion and between the lock wing and the first member first surface.

14. A fastening arrangement for connecting a first member to a second member comprising:
a first member having first and second surfaces and an elongated aperture connecting the first and second surfaces;
a second member having a first surface for contact with the first member second surface, the second member having an aperture intersecting with the first surface for registration with the aperture of the first member, the second member also having a recessed second surface with a ramp opposite the first surface, and the second surface having two arms;
a pin having on one end a thumb tab connected with a flange and projecting on another side of the flange from the thumb tab a lock wing, the flange being deformable, allowing it to be snapped into the recessed portion of the second member to be attached with the second member before the second member is secured to the first member, and the flange having studs to prevent overturning of the pin, the flange having opposite the thumb tab a ramp which in cooperation with the second member ramp prevents reverse turning of the pin after assembly, and the pin having a lock wing with a deformable portion insertable into the apertures of the first and second members to insure the angular orientation of the lock wings when the pin is attached with the second member for projection of the lock wing into the apertures of the first and second members, and whereby angular relocation of the pin causes the pin flange to be displaced with respect to the first member and to be captured by the arms of the second member and for the lock wing to secure the pin from removal due to the angular orientation of the lock wing with the first member aperture.

15. A fastening arrangement of a first member connected with a second member comprising:
a first member having first and second surfaces and an elongated aperture intersecting the first and second surfaces;
a second member having a first surface for contact with the first member second surface, the second member having an aperture intersecting with the first surface for registration with the aperture of the first member, the second member also having a second surface generally opposite the first surface and the second member second surface having at least two arms;
a pin having a midportion with a first surface for engaging contact with the second member second surface, the pin also having on the end of the pin adjacent the first member projecting from the midportion a lock wing, and the pin having on a side of the midportion opposite the lock wing a torsional force receptive surface to facilitate the importation of torsional force to the pin to achieve angular positional relocation of the pin, the pin being compliantly attached with the arms before the second member is secured with the first member, wherein to secure the first and second members together the pin lock wing is projected through the apertures of the first and second members and a torsional relocation of the pin causes the lock wing to be rotated to secure the pin from removal by its angular orientation with respect to the first member aperture.

16. An arrangement as described in claim 15 wherein the pin has a thumb tab providing the torsion force receptive surface.

17. An arrangement as described in claim 15 wherein the pin has a tapered surface for contacting the second member arm, the tapered surface aids in the deformation of the pin.

18. An arrangement as described in claim 15 wherein the second member is made of a moldable material.

19. An arrangement as described in claim 15 further providing means to prevent overturning of the pin.

20. An arrangement as described in claim 15 wherein the second surface has a recessed portion and wherein the midportion of the pin is captured therein.

21. An arrangement as described in claim 15 further providing means to insure angular orientation of the pin.

22. An arrangement as described in claim 21 further including deformable lock wing portions which are deformed upon angular relocation of the pin.

23. An arrangement as described in claim 22 wherein the deformable lock wing portions become entrapped between the lock wing and the first member first surface upon angular relocation of the pin.

24. An arrangement as described in claim 15 wherein, after angular relocation of the pin, a normal force exists between the lock wing and the first member first surface.

25. An arrangement as described in claim 15 wherein the pin midportion first surface has a ramp.

26. An arrangement as described in claim 25 wherein the second member has a ramp which prevents reverse turning of the pin after it has been rotated to secure the first and second members together.

27. An arrangement as described in claim 26 wherein at least one of the ramps on the pin midportion first surface and the second member second surface has a tapered edge to facilitate reverse turning of the pin.

28. A fastening arrangement for connecting a first member to a second member comprising:

a first member having first and second surfaces and an elongated aperture connecting the first and second surfaces;

a second member having a first surface for contact with the first member second surface, the second member having an aperture intersecting with the first surface for registration with the aperture of the first member, the second member also having a recessed second surface with a ramp opposite the first surface, and the second surface having two arms;

a pin having on one end a thumb tab connected with a flange and projecting on another side of the flange from the thumb tab a lock wing, the flange being deformable, allowing it to be snapped into the recessed portion of the second member to be attached with the second member before the second member is secured to the first member, and the flange having studs to prevent overtorquing of the pin, and the pin having a lock wing with a deformable portion insertable into the apertures of the first and second members to insure the angular orientation of the lock wings when the pin is attached with the second member for projection of the lock wing into the apertures of the first and second members, and whereby angular relocation of the pin causes the lock wings to rotate to secure the pin from removal, creating a normal force between the lock wing and the first member first surface to secure the pin from removal due to the angular orientation of the lock wing with the first member aperture, and the pin flange having opposite the thumb tab a ramp which in cooperation with the ramp of the second member prevents reverse turning of the pin after assembly of the arrangement.

* * * * *